United States Patent
Koide

(10) Patent No.: US 8,964,050 B2
(45) Date of Patent: Feb. 24, 2015

(54) IMAGE CAPTURING APPARATUS, CONTROL METHOD THEREFOR, AND PROGRAM

(75) Inventor: Yuji Koide, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1177 days.

(21) Appl. No.: 12/276,736

(22) Filed: Nov. 24, 2008

(65) Prior Publication Data

US 2009/0153692 A1    Jun. 18, 2009

(30) Foreign Application Priority Data

Dec. 13, 2007    (JP) ................................ 2007-322543

(51) Int. Cl.
    *H04N 5/232*      (2006.01)
    *H04N 1/00*      (2006.01)
    *H04N 101/00*      (2006.01)
    *H04W 88/06*      (2009.01)

(52) U.S. Cl.
    CPC ........... *H04N 1/00347* (2013.01); *H04N 5/232* (2013.01); *H04N 2101/00* (2013.01); *H04N 2201/0015* (2013.01); *H04N 2201/0041* (2013.01); *H04N 2201/0043* (2013.01); *H04N 2201/0044* (2013.01); *H04N 2201/0055* (2013.01); *H04N 2201/0084* (2013.01); *H04W 88/06* (2013.01)
    USPC .................................................... 348/211.3

(58) Field of Classification Search
    USPC .......................... 348/211.99–211.14; 709/227
    See application file for complete search history.

(56) References Cited

U.S. PATENT DOCUMENTS

| | | | |
|---|---|---|---|
| 6,204,877 B1 * | 3/2001 | Kiyokawa | 348/211.3 |
| 6,701,058 B1 * | 3/2004 | Tsubaki | 386/226 |
| 7,495,687 B2 * | 2/2009 | DuMas et al. | 348/143 |
| 2001/0022624 A1 * | 9/2001 | Tanaka et al. | 348/333.02 |
| 2004/0012810 A1 * | 1/2004 | Haas et al. | 358/1.15 |
| 2004/0109063 A1 * | 6/2004 | Kusaka et al. | 348/207.1 |

(Continued)

FOREIGN PATENT DOCUMENTS

| | | |
|---|---|---|
| CN | 1343423 A | 4/2002 |
| JP | 2003-179840 A | 6/2003 |

(Continued)

OTHER PUBLICATIONS

Partial English translation by human translator of JP2004-040370, submitted with Information Disclosure Statement filed Nov. 24, 2008; paragraphs [0050]-[0056]; Figs. 4,5.

(Continued)

*Primary Examiner* — Christopher K Peterson
(74) *Attorney, Agent, or Firm* — Cowan, Liebowitz & Latman, P.C.

(57) ABSTRACT

An image capturing apparatus having a plurality of communication modes comprises an image capturing unit adapted to capture an object image and obtain image data, and a control unit adapted to control the image capturing apparatus, wherein the plurality of communication modes include a host mode in which the image capturing apparatus is able to communicate with a plurality of external devices and a client mode in which the image capturing apparatus is disable to simultaneously communicate with the plurality of external devices, and wherein the control unit is able to automatically switch the image capturing apparatus to the host mode after an image capturing instruction is applied to the image capturing unit.

12 Claims, 13 Drawing Sheets

(56) References Cited

U.S. PATENT DOCUMENTS

| | | |
|---|---|---|
| 2004/0150724 A1* | 8/2004 | Nozaki et al. ............... 348/211.4 |
| 2006/0165405 A1* | 7/2006 | Kanai et al. ................... 396/334 |
| 2007/0076960 A1* | 4/2007 | Takamori et al. ............. 382/224 |
| 2007/0177023 A1* | 8/2007 | Beuhler et al. .............. 348/211.3 |
| 2007/0283018 A1* | 12/2007 | Yun .............................. 709/226 |

FOREIGN PATENT DOCUMENTS

| | | |
|---|---|---|
| JP | 2003-224568 | 8/2003 |
| JP | 2004-040370 | 2/2004 |
| JP | 2005-176106 A | 6/2005 |
| JP | 2005-252457 | 9/2005 |
| JP | 2006-217159 A | 8/2006 |
| JP | 2007-166143 A | 6/2007 |
| JP | 2007-215064 A | 8/2007 |
| JP | 2007-282118 A | 10/2007 |
| WO | 00/56074 A | 9/2000 |

OTHER PUBLICATIONS

Partial English translation by human translator of JP2003-224568, submitted with Information Disclosure Statement filed Nov. 24, 2008; paragraphs [0056]-[0058]; Figs. 5, 7.

Jun. 10, 2010 Chinese Office Action that issued in Chinese Patent Application No. 200810183279.6.

Dec. 2, 2011 Japanese Office Action that issued in Japanese Patent Application No. 2007-322543.

* cited by examiner

F I G. 2
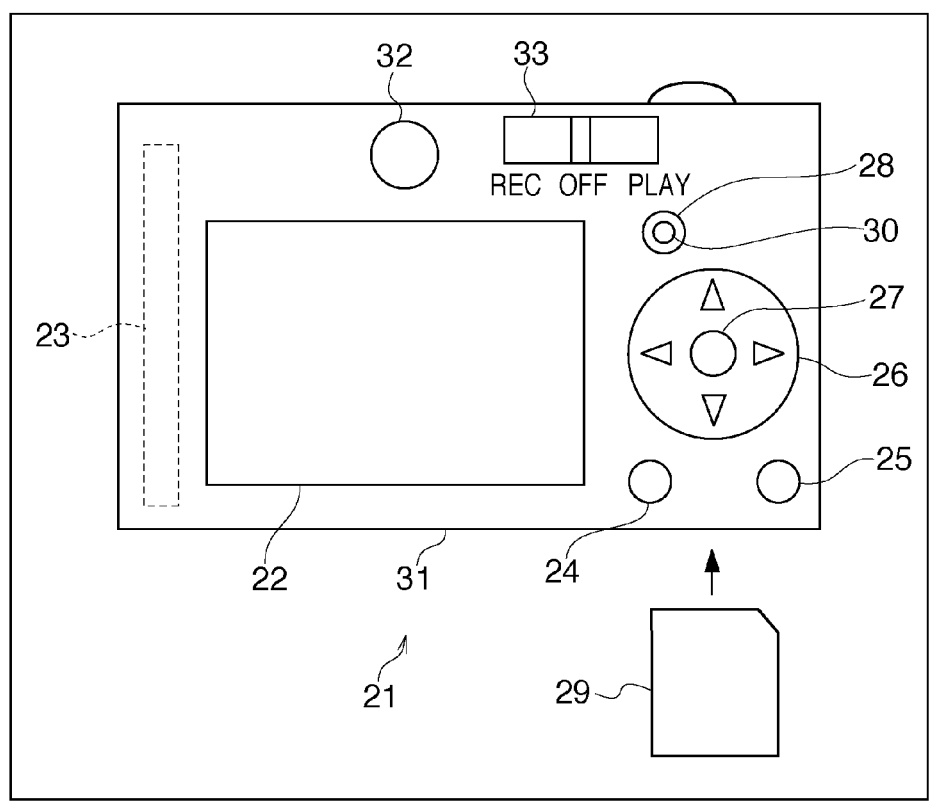

FIG. 4

| IMAGE TO BE TRANSMITTED | |
|---|---|
| 1. ALL | |
| 2. SELECT | |
| 2-a. GROUP PHOTOS | ○ |
| 2-b. SMILE | × |
| 2-c. PERSONS | × |
| 2-d. REGISTERED PERSONS | × |

FIG. 5

TRANSMISSION TIMING

1. OFF

2. AFTER SHOOTING (10 SEC)

3. DURING PLAYBACK

4. AFTER SHOOTING + DURING PLAYBACK

FIG. 9

| RECEPTION TIMING | |
|---|---|
| 1. PLAYBACK MODE | ON |
| 2. POWER OFF | OFF |
| 3. SHOOTING MODE | OFF |
| 3-a. DURING EVF | OFF |
| 3-b. DURING SHOOTING PREPARATION | OFF |

F I G. 13

| IMAGE FILE NAME | TRANSMISSION PERMISSION/ INHIBITION | COMMUNICATION STATE |
|---|---|---|
| IMG_0010.JPG | ○ | INTERRUPTED |
| IMG_0011.JPG | ○ | TRANSMITTED SUCCESSFULLY |
| IMG_0012.JPG | ○ | TRANSMITTED SUCCESSFULLY |
| IMG_0013.JPG | ○ | UNTRANSMITTED |
| IMG_0014.JPG | ○ | UNTRANSMITTED |
| ⋮ | ⋮ | ⋮ |

1301    1302    1303

IMAGE CAPTURING APPARATUS, CONTROL METHOD THEREFOR, AND PROGRAM

BACKGROUND OF THE INVENTION

1. Field of the Invention

The present invention relates to an apparatus which comprises a communication unit having host and client modes, and can transmit image data to another device.

2. Description of the Related Art

Conventionally, an image captured by an image capturing apparatus such as a digital camera is transmitted to another device such as a computer or digital camera which is connected to the image capturing apparatus by wire or wirelessly.

For example, there is known an apparatus which compares a captured image with owner information of an external device, and when they match each other, wirelessly transmits the captured image to the external device (see Japanese Patent Laid-Open No. 2005-252457).

As a communication means used at this time, a method compliant with a communication interface standard such as USB (Universal Serial Bus) or IEEE1394 is popular at present.

A method compliant with a wireless LAN standard such as IEEE802.11b or IEEE802.11g is also sometimes used.

The use of a method compliant with a WUSB (Wireless Universal Serial Bus) standard for wirelessly using a USB has also been examined.

Some of these interfaces, as typified by the USB and WUSB, define the relation between two devices in the physical layer. For example, when connecting digital cameras using a USB, it is necessary to define one digital camera as a USB host and the other as a USB device.

According to the On-The-Go standard established as part of the USB standard, a cable having a Mini-A plug and Mini-B plug at two ends is defined as a cable for connecting devices having USB interfaces. When this cable is used, a device to which the Mini-A plug is connected serves as a USB host upon connection, and a device to which the Mini-B plug is connected serves as a USB device. Hence, when connecting digital cameras using a USB-compliant communication unit, the cable is connected to determine one serving as a USB host and the other serving as a USB device.

For example, an image processing apparatus disclosed in Japanese Patent Laid-Open No. 2004-40370 pertains to a technique of connecting digital cameras using a USB-compliant communication means to transmit/receive an image file.

Even according to the WUSB, it is necessary to define one of digital cameras as a WUSB host and the other as a WUSB device. In other words, when the user connects digital cameras via a WUSB, he needs to activate one of them as a WUSB host and the other as a WUSB device.

For example, even when transmitting image data captured by a digital camera to another connected digital camera, one of them operates in the host mode, and the other operates in the client mode. For example, when digital cameras are connected by a communication interface which defines the association between two devices in the physical layer, as typified by the USB and WUSB, it is necessary to operate one of the digital cameras in the host mode and the other in the client mode. In this case, it is necessary to determine which of the digital cameras operates in the host mode.

This also applies to a case where three or more digital cameras transmit captured image data to the remaining connected digital cameras. That is, when digital cameras are connected by a communication interface which defines the association between devices in the physical layer, it is necessary to operate one of the digital cameras in the host mode and the remaining digital cameras in the client mode. At this time, the digital cameras in the client mode cannot directly transmit image data to each other.

The technique disclosed in Japanese Patent Laid-Open No. 2005-252457 does not consider connection of devices by a communication interface, such as a USB or WUSB, which defines the association between two devices in the physical layer. A mechanism for determining which of devices changes into the host mode needs to be separately arranged. For example, the user needs to assign the host and client modes to devices.

When the technique disclosed in Japanese Patent Laid-Open No. 2005-252457 is applied to three or more devices connected by a communication interface which defines the association between devices in the physical layer, a device in the host mode needs to relay data exchange between devices in the client mode, complicating the configuration.

According to the technique disclosed in Japanese Patent Laid-Open No. 2004-40370, the user needs to operate a master camera to switch between the host and client modes. Also, the user cumbersomely needs to designate image data to be transmitted to a connected device.

SUMMARY OF THE INVENTION

It is an object of the present invention to improve usability when transmitting image data to another device.

To achieve the above-described object, according to the first aspect of the present invention, there is provided an image capturing apparatus having a plurality of communication modes comprising an image capturing unit adapted to capture an object image and obtain image data, and a control unit adapted to control the image capturing apparatus, wherein the plurality of communication modes include a host mode in which the image capturing apparatus is able to communicate with a plurality of external devices and a client mode in which the image capturing apparatus is disable to simultaneously communicate with the plurality of external devices, and wherein the control unit is able to automatically switch the image capturing apparatus to the host mode after an image capturing instruction is applied to the image capturing unit.

According to the second aspect of the present invention, there is provided a method of controlling an image capturing apparatus having a plurality of communication modes, comprising capturing an object image and obtaining image data, and controlling the image capturing apparatus by a control unit, wherein the plurality of communication modes include a host mode in which the image capturing apparatus is able to communicate with a plurality of external devices and a client mode in which the image capturing apparatus is disable to simultaneously communicate with the plurality of external devices, and wherein, in the controlling step, the control unit automatically switches the image capturing apparatus to the host mode after an image capturing instruction is applied to the image capturing unit.

Further features of the present invention will become apparent from the following description of exemplary embodiments with reference to the attached drawings.

BRIEF DESCRIPTION OF THE DRAWINGS

FIG. 2 is a view showing the outer appearance of the digital camera common to the embodiments of the present invention;

FIG. 4 is a view showing a digital camera setup window common to the embodiments of the present invention;

FIG. 5 is a view showing a digital camera setup window common to the embodiments of the present invention;

FIG. 9 is a view showing a digital camera setup window in the second embodiment of the present invention;

FIG. 13 is a table for explaining a table representing the image data transmission state of the digital camera in the third embodiment of the present invention.

DESCRIPTION OF THE EMBODIMENTS

Preferred embodiments of the present invention will be described in detail.

An outline of the embodiments of the present invention will be explained first.

The embodiments of the present invention are related to a management apparatus such as a digital camera which comprises a communication unit having a host mode in which a plurality of external devices in the client mode can be simultaneously connected, and a client mode in which one external device in the host mode can be simultaneously connected. The embodiments of the present invention improve usability when transmitting captured image data to another external device.

The embodiments of the present invention assume a digital camera having a WUSB communication unit. The embodiments are also applicable to even the relationship between an access point and a station in wireless communication. For example, the embodiments are similarly applicable to a communication device which comprises a communication unit having a host mode (access point) in which a plurality of devices in the client mode can be simultaneously connected, and a client mode (station) in which one device in the host mode can be simultaneously connected. When the digital camera according to the embodiments captures image data, it determines whether the captured image data can be transmitted, and when determining that the captured image data can be transmitted, can automatically transmit the captured image data to another device.

First Embodiment

The first embodiment of an image data management apparatus according to the present invention will be described below with reference to the accompanying drawings.

Figure 1:
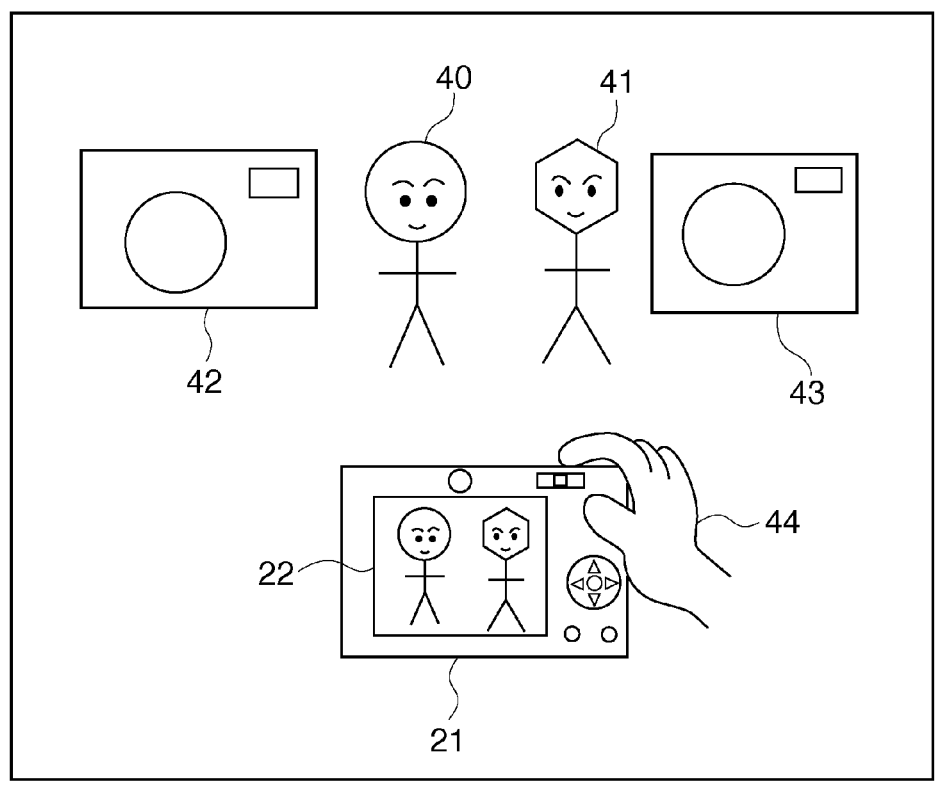
FIG. 1 is a view showing the use form of a digital camera common to embodiments of the present invention.

FIG. 1 is a view for explaining an outline of an image data transmission operation using the image data management apparatus according to the first embodiment of the present invention.

In FIG. 1, reference numeral 44 denotes an image photographer; 21, a digital camera of the photographer 44; and 22, a display of the digital camera 21. Reference numeral 40 denotes a person, that is, object captured by the digital camera 21; and 42, a digital camera of the object 40. Reference numeral 41 also denotes a person, that is, object captured by the digital camera 21; and 43, a digital camera of the object 41.

The digital cameras 21, 42, and 43 comprise WUSB communication units, and can transmit/receive captured image data between them.

The outer appearance of the digital camera 21 will be explained with reference to FIG. 2. FIG. 2 is a view showing the outer appearance of the digital camera 21.

The digital camera 21 comprises a housing 31, the display 22, a WUSB I/F (wireless communication unit) 23, and a storage medium 29. As the operating unit, the digital camera 21 comprises a DISP button 24, MENU button 25, 4-direction key 26, SET button 27, wireless button 28, and main switch & mode switch 33. The digital camera 21 also comprises an LED 30 and optical viewfinder 32.

The display 22 is formed on a surface of the housing 31 opposite to a surface provided with a photographing lens (not shown). The display 22 is, for example, an LCD monitor. The display 22 displays live an object to be captured, allowing the photographer to confirm the composition and exposure (electronic viewfinder function), and confirm a captured image. The display 22 displays captured image data, various setting menus, and the like, allowing the photographer to view image data, and confirm various setting menus and the like.

The housing 31 incorporates the WUSB I/F 23.

The storage medium 29 is detachably connected to the housing 31. The storage medium 29 saves, for example, image data. Examples of the storage medium 29 are a removable storage device (e.g., an SD card), a memory card, a magneto-optical disk, and other removal media.

The DISP button 24 is arranged near the display 22 on the housing 31. The DISP button 24 receives an electronic viewfinder display instruction. The DISP button 24 also receives an instruction to switch whether or not to display shooting assist information and attribute information when displaying a captured image for confirmation.

The MENU button 25 is arranged near the display 22 on the housing 31. The MENU button 25 receives an instruction for various settings.

The 4-direction key 26 is arranged near the display 22 on the housing 31. The 4-direction key 26 receives an instruction to sequentially switch images when displaying a captured image for confirmation. The 4-direction key 26 also receives an instruction to switch the menu item in a menu operation.

The SET button 27 is arranged near the display 22 and 4-direction key 26 on the housing 31. The SET button 27 receives an instruction to determine a menu item in a menu operation.

The wireless button 28 is arranged near the display 22 on the housing 31. The wireless button 28 receives an instruction to start wireless communication.

The LED 30 is arranged near the display 22 and wireless button 28 on the housing 31. The LED 30 flickers or is turned on/off to notify the user of the wireless communication status.

The main switch & mode switch 33 has three positions: a shooting mode (REC), power OFF, and playback mode (PLAY). The user sets the main switch & mode switch 33 to the shooting mode when photographing an object, and the playback mode when viewing captured image data.

Figure 3:
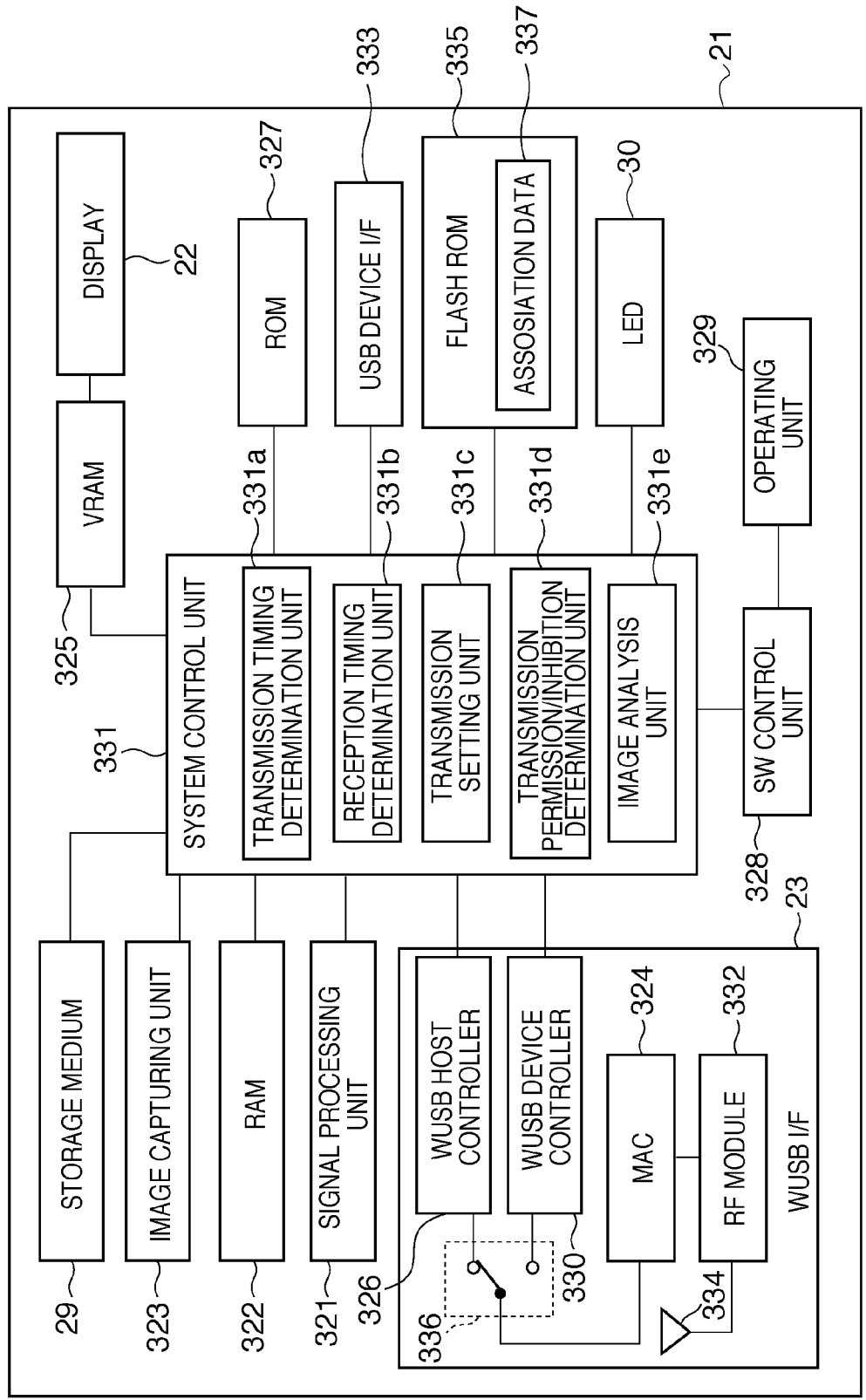
FIG. 3 is a block diagram showing the arrangement of the digital camera common to the embodiments of the present invention.

The arrangement and operation of the digital camera 21 will be explained with reference to FIG. 3. FIG. 3 is a block diagram showing the arrangement of the digital camera.

The digital camera 21 comprises an image capturing unit 323, a system control unit 331, a signal processing unit 321, a RAM 322, a ROM 327, an operating unit 329, an SW control unit 328, and the LED 30. The digital camera 21 further comprises a VRAM 325, the WUSB I/F 23, a USB device I/F 333, and a flash ROM 335. The digital camera 21 detachably comprises the storage medium 29.

The WUSB I/F 23 is used to connect the digital camera 21 to other devices (e.g., the digital cameras 42 and 43 shown in FIG. 1). The WUSB I/F 23 includes a WUSB device controller 330, WUSB host controller 326, host/device switching unit 336, MAC (physical layer control unit) 324, RF module 332, and antenna 334. When the digital camera 21 operates as a WUSB host, the host/device switching unit 336 is controlled to enable the WUSB host controller 326 and connect the WUSB host controller 326 and MAC 324. When the digital camera 21 operates as a WUSB device, the host/device switching unit 336 is controlled to enable the WUSB device controller 330 and connect the WUSB device controller 330 and MAC 324. Since the MAC 324, RF module 332, and antenna 334 are shared between a case where the digital camera 21 operates as a WUSB host and a case where it operates as a WUSB device, the number of components and the mounting area can be reduced. The digital cameras 42 and 43 shown in FIG. 1 also have the WUSB host function and WUSB device function.

The USB device I/F 333 is used to connect the digital camera 21 to a PC (not shown) or a printer (not shown) having the direct print function via a USB cable and communicate with it.

The image capturing unit 323 includes a photographing lens (not shown), image sensor, and analog/digital (A/D) converter. The image sensor is, for example, a CCD or CMOS sensor. The image sensor photoelectrically converts an object image formed by the photographing lens, generating an analog image signal. The analog/digital (A/D) converter is arranged on the output side of the CCD. The analog/digital (A/D) converter receives an analog image signal from the CCD, and A/D-converts it, generating a digital image signal. The image capturing unit 323 outputs a digital image signal. The system control unit 331 includes a transmission timing determination unit 331a, reception timing determination unit 331b, transmission setting unit 331c, transmission permission/inhibition determination unit 331d, and image analysis unit 331e.

The transmission timing determination unit 331a determines the image data transmission timing in accordance with the operation state and setting state of the digital camera 21, and the determination result of the transmission permission/inhibition determination unit 331d. When the transmission timing determination unit 331a determines that the current timing is an image data transmission timing, the digital camera 21 controls the host/device switching unit 336 to enable the WUSB host controller 326 and connect the WUSB host controller 326 and MAC 324.

The reception timing determination unit 331b determines the image data reception timing in accordance with the operation state and setting state of the digital camera 21. When the reception timing determination unit 331b determines that the current timing is an image data reception timing, the digital camera 21 controls the host/device switching unit 336 to enable the WUSB device controller 330 and connect the WUSB device controller 330 and MAC 324.

The transmission setting unit 331c sets image data to be transmitted to a transmittable state, and image data not to be transmitted to an untransmittable state. By this setting, the transmission setting unit 331c controls to allow transmitting only target image data to other devices (e.g., the digital cameras 42 and 43 in FIG. 1) via the WUSB I/F 23.

Based on the analysis result of the image analysis unit 331e and the like, the transmission permission/inhibition determination unit 331d determines whether captured image data or image data displayed on the display 22 can be transmitted. If the transmission permission/inhibition determination unit 331d determines that the target image data can be transmitted, the transmission setting unit 331c sets the target image data to a transmittable state.

The image analysis unit 331e analyzes image data.

In the first embodiment, the system control unit 331 formed from one piece of hardware has a plurality of functions and executes a variety of functions. However, the control unit need not always be formed from one piece of hardware. For example, a plurality of hardware components may also function as a control unit to provide and execute respective functions.

The system control unit 331 is connected to the image capturing unit 323, signal processing unit 321, RAM 322, ROM 327, SW control unit 328, LED 30, VRAM 325, WUSB I/F 23, USB device I/F 333, and flash ROM 335. When the storage medium 29 is mounted, it is connected to the system control unit 331. The system control unit 331 supplies control instructions to the image capturing unit 323 and the like to control the overall operation of the digital camera 21.

For example, the system control unit 331 causes the image capturing unit 323 to capture an object, receives a digital image signal from the image capturing unit 323, and transfers it to the signal processing unit 321. The system control unit 331 controls the signal processing unit 321 to perform predetermined signal processing for a digital image signal. The system control unit 331 receives a processed digital image signal from the signal processing unit 321, and temporarily stores it in the RAM 322. The system control unit 331 generates, from a digital image signal stored in the RAM 322, an image file in which attribute information such as shooting setting information is added to the header area of the digital image signal stored in the RAM 322, and saves the image file in the storage medium 29 and flash ROM 335.

The SW control unit 328 controls an input from the operating unit 329. For example, the SW control unit 328 converts an input signal from the operating unit 329 into predetermined data, and transfers the data to the system control unit 331.

The operating unit 329 includes the DISP button 24, MENU button 25, 4-direction key 26, SET button 27, and wireless button 28 (see FIG. 2). The operating unit 329 accepts a predetermined instruction from the user.

The VRAM 325 holds display data of a digital image signal, display data of various user interfaces, and the like.

The display 22 is connected to the VRAM 325. The display 22 displays display data held in the VRAM 325.

The ROM 327 stores a program for capturing an image, a program for displaying a captured image on the display 22, a communication program, and the like.

The flash ROM 335 holds Association data 337. The WUSB standard adapts secret key cryptography as data cryptography. A secrete key needs to be generated between a WUSB host and a WUSB device. The WUSB standard defines authentication processing to share a CC (Connection Context) which is used to generate the secret key and formed from a master key (connection key) and the like. This processing is called an Association process. The WUSB host and WUSB device need to share the CC in accordance with the Association process before establishing WUSB communication. In the Association process, the WUSB host and WUSB device can exchange their pieces of information such as a device name "Friendly Name" in addition to the CC for generating a secrete key.

The CC shared once in the Association process, and partner device information such as the device name are held together as the Association data 337.

When the digital camera 21 is connected to, for example, the digital camera 42 shown in FIG. 1 via the WUSB I/F 23, two connection forms are conceivable. In one connection form, the digital camera 21 operates as a WUSB host, and the digital camera 42 operates as a WUSB device. In the other connection form, the digital camera 21 operates as a WUSB device, and the digital camera 42 operates as a WUSB host. The Association data 337 holds CCs corresponding to the respective connection forms.

Assume that the digital camera 21 in the first embodiment has completed the Association process with devices to be connected (e.g., the digital cameras 42 and 43 shown in FIG. 1).

The WUSB standard inhibits WUSB connection with a device which does not share the CC. Thus, the WUSB standard can prevent erroneous transmission of image data to a device which does not share the CC.

FIG. 4 shows a setup window for setting, in the digital camera 21 according to the first embodiment, whether to permit/inhibit transmission of image data. The user can use the transmission permission/inhibition condition setup window to automatically designate the type of image data to be transmitted to another device. If the user selects "1. All", the transmission permission/inhibition determination unit 331d determines that all captured image data can be transmitted. If the user selects "2. Select", the transmission permission/inhibition determination unit 331d determines, in accordance with contents set in items 2-a to 2-d, whether image data can be transmitted. In the items 2-a to 2-d, the user designates "○" or "×". If the user selects "1. All", "–" is automatically displayed in the items 2-a to 2-d to represent that settings are invalid. If the user sets "○" in "2-a. Group Photos", and the image analysis unit 331e analyzes image data to recognize two or more persons as objects, the transmission permission/inhibition determination unit 331d determines that the target image data can be transmitted. If the user sets "○" in "2-b. Smile", and the image analysis unit 331e analyzes image data to recognize that the object person smiles, the transmission permission/inhibition determination unit 331d determines that the target image data can be transmitted. If the user sets "○" in "2-c. Persons", and the image analysis unit 331e analyzes image data to recognize that the object is a person, the transmission permission/inhibition determination unit 331d determines that the target image data can be transmitted. If the user sets "○" in "2-d. Registered Persons", and the image analysis unit 331e analyzes image data to recognize that the object is a person whose face image data has been registered in advance, the transmission permission/inhibition determination unit 331d determines that the target image data can be transmitted. If the user sets "×" in "2-d. Registered Persons", and the object is recognized to be a person whose face image data has been registered in advance, the transmission permission/inhibition determination unit 331d determines that no target image data can be transmitted. For example, when the user wants to transmit image data containing a specific person as an object, he suffices to set "○" in "2-d. Registered Persons". When it is determined better not to transmit image data containing a person with high degree of privacy as an object, the user suffices to register data of the face image of the person, and then sets "×" in "2-d. Registered Persons".

The first embodiment will explain a case where captured image data is automatically transmitted to another device. Hence, assume that the user selects "1. All" in the transmission permission/inhibition condition setup window.

FIG. 5 shows a setup window for setting an image data transmission timing in the digital camera 21 according to the first embodiment. The user can use the transmission timing setup window to designate the state of the digital camera 21 in which the digital camera 21 can automatically transmit image data to another device. If the user selects "1. OFF", the transmission timing determination unit 331a inhibits automatically transmitting image data regardless of the state of the digital camera 21. If the user selects "2. After Shooting (10 sec)", and the transmission permission/inhibition determination unit 331d determines that captured image data can be transmitted, the transmission timing determination unit 331a determines that a period of 10 sec after capturing image data by the digital camera 21 is the transmission timing of the captured image data. It is also possible to allow the user to designate a period after shooting as the transmission timing. If the user selects "3. During Playback", and the transmission permission/inhibition determination unit 331d determines that the digital camera 21 can transmit image data displayed in the playback mode, the transmission timing determination unit 331a determines that the period during which the target image data is displayed is the image data transmission timing. If the user selects "4. After Shooting+During Playback", the transmission timing determination unit 331a determines that both the period of 10 sec after capturing image data by the digital camera 21 and the period during which the target image data is displayed are image data transmission timings.

The first embodiment will explain a case where captured image data is automatically transmitted to another device immediately after shooting an image. Thus, assume that the user selects "2. After Shooting (10 sec)" in the transmission timing setup window.

Figure 6:
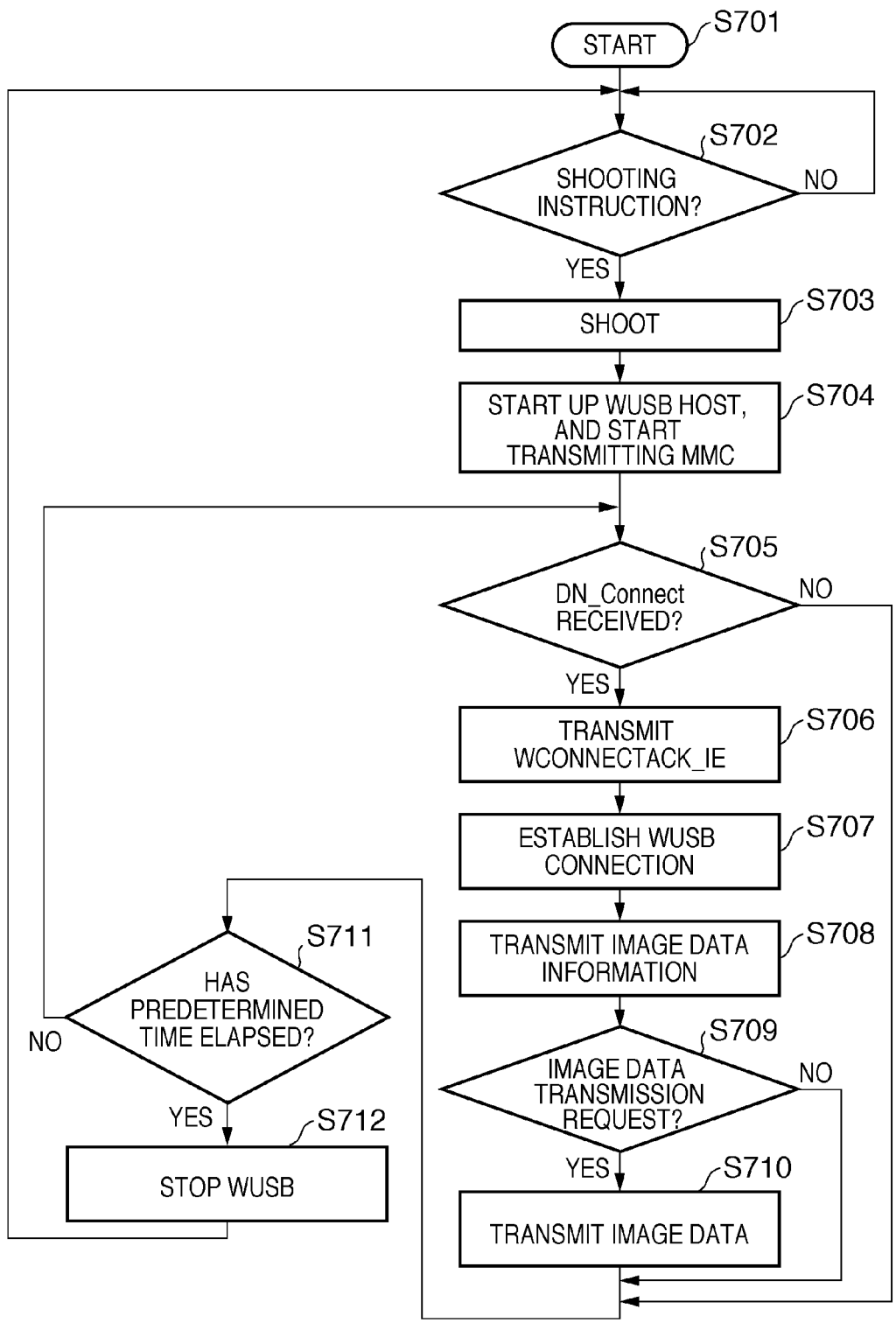
FIG. 6 is a flowchart for explaining the image data transmission sequence of a digital camera in the first embodiment of the present invention.
Figure 7:
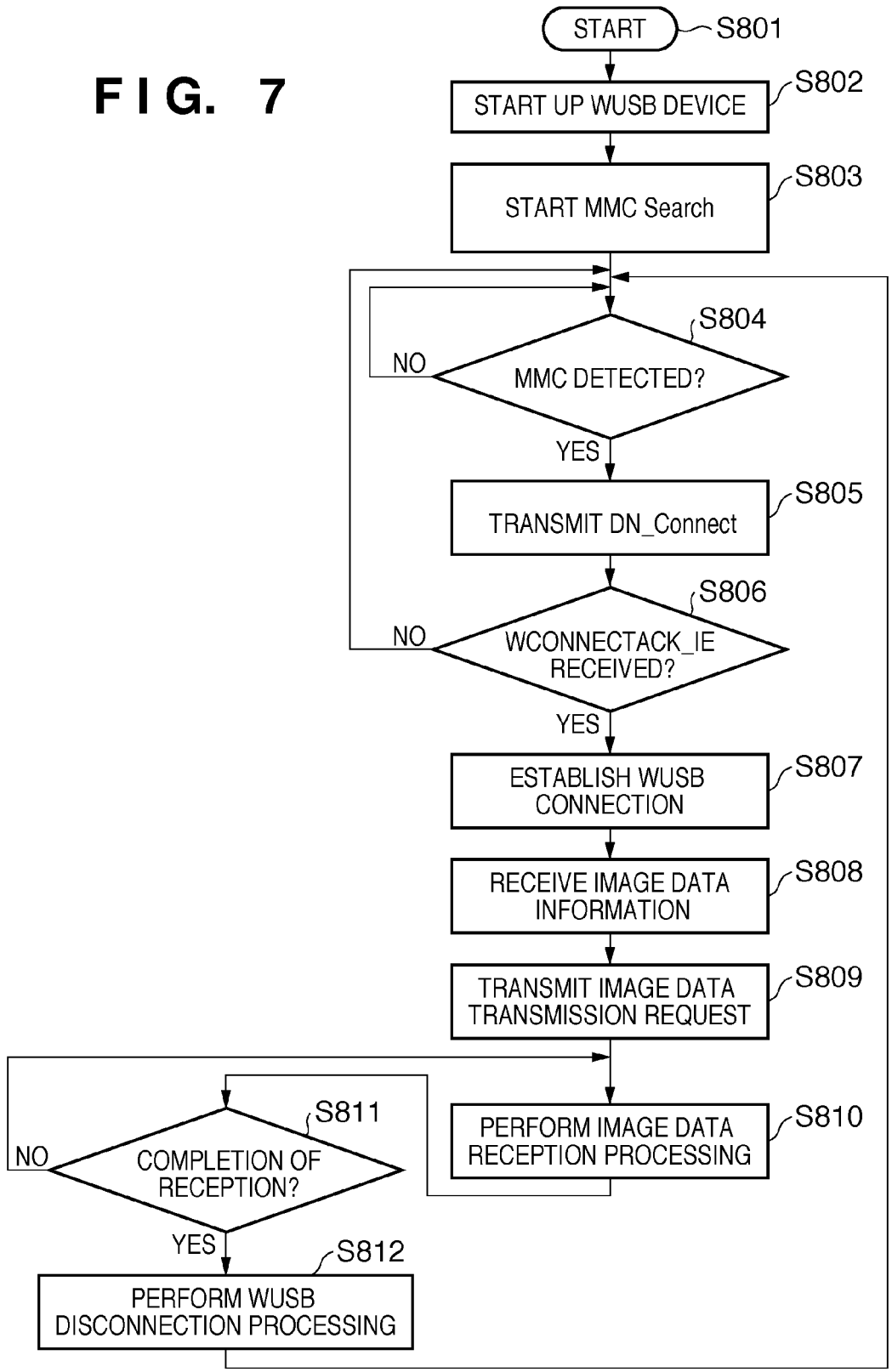
FIG. 7 is a flowchart for explaining the image data reception sequence of the digital camera in the first embodiment of the present invention.

A sequence to transmit captured image data from the digital camera 21 to another device (e.g., the digital camera 42 in FIG. 1) in the first embodiment will be explained with reference to the flowcharts of FIGS. 6 and 7. FIG. 6 is a flowchart showing the operation of the digital camera 21. FIG. 7 is a flowchart showing the operation of the digital camera 42. The processes in these flowcharts are achieved by controlling the respective units of the digital camera by the system control unit 331 of the digital camera in accordance with input signals and programs from these units. This also applies to processing executed by each digital camera in the following description.

In step S702, the digital camera 21 determines whether it has received a shooting instruction from the user. If the digital camera 21 determines that it has received a shooting instruction, it performs a shooting operation in step S703, obtaining image data.

In the first embodiment, after capturing an image, the digital camera 21 changes to a mode in which it automatically transmits captured image data to another device. Thus, in step S704, the digital camera 21 starts up as a WUSB host, and starts transmitting an MMC (Micro-scheduled Management Command) packet defined by the WUSB standard.

In step S802, the digital camera 42 serving as the receiving side of image data captured by the digital camera 21 starts up as a WUSB device. In step S803, the digital camera 42 starts an MMC search operation, and searches for a WUSB host having undergone the Association process.

If the digital camera 42 detects in step S804 the MMC packet of the digital camera 21 serving as a WUSB host having undergone the Association process, it transmits a DN_Connect packet as a WUSB connection request in step S805. The DN_Connect packet includes a field which describes a CDID (Connection Device ID) value uniquely assigned to a WUSB device. The WUSB host can check the CDID value field of the DN_Connect packet to identify a WUSB device which has issued a connection request.

Upon receiving the DN_Connect packet from the digital camera 42 in step S705, the digital camera 21 transmits a WCONNECTACK_IE packet representing connection permission in step S706.

In step S707, the digital camera 21 establishes a WUSB connection with the digital camera 42 to which the digital camera 21 has issued the connection permission. At this time, the digital camera 21 executes 4-way handshake processing complying with the WUSB standard, and negotiation processing using a GetDescriptor packet and SetConfiguration packet similar to those of the wired USB standard. The 4-way handshake processing includes authentication processing using a master key (CK) shared in advance in the Association process. Thus, no WUSB connection is established between devices which do not share the CC in the Association process.

In step S806, the digital camera 42 receives the WCONNECTACK_IE packet from the digital camera 21 serving as the WUSB host. In step S807, the digital camera 42 establishes a WUSB connection with the digital camera 21 by the 4-way handshake processing and the like.

If the digital camera 42 has not received the WCONNECTACK_IE packet in step S807, it returns to the MMC packet detection operation in step S804.

After establishing the WUSB connection, the digital camera 21 transmits, in step S708, information of the image data captured in step S703 to the digital camera 42. The information to be transmitted may also contain the image data identifier, information on the owner name of the digital camera 21, information on the shooting date and time, information on the data size of the image data, and information on the analysis result of the image analysis unit 331e.

In step S709, the digital camera 21 checks whether it has received an image data transmission request from the digital camera 42. If the digital camera 21 has received an image data transmission request from the digital camera 42, it transmits, in step S710, image data captured in step S703 to the digital camera 42, and then advances to step S711. If the digital camera 21 has not received an image data transmission request, it advances to step S711 without performing the image data transmission processing.

After establishing the WUSB connection, the digital camera 42 receives image data information from the digital camera 21 in step S808. The digital camera 42 checks the received image data information, and if it determines that the received image data is a desired one, transmits an image data transmission request in step S809. For example, when the user of the digital camera 42 wants to obtain only image data in which the object person smiles, the digital camera 42 checks image analysis result information contained in the image data information. Based on whether the image data information contains an analysis result representing that the object person smiles, the digital camera 42 determines whether to transmit an image data transmission request. It can be controlled to receive only image data the user wants.

In step S810, the digital camera 42 receives image data transmitted from the digital camera 21. In step S811, the digital camera 42 checks whether the reception is complete. If the reception is not complete, the digital camera 42 continues the image data reception processing in step S810. Upon completion of the reception, the digital camera 42 transmits a DN_Disconnect packet defined by the WUSB standard in step S812, disconnecting the WUSB connection.

After that, the digital camera 42 returns to the MMC packet search operation in step S804, and waits for the next timing when the digital camera 21 captures an image and starts up as a WUSB host in order to transmit the image data. Even when a device other than the digital camera 21 starts up as a WUSB host in order to transmit captured image data, the digital camera 42 can detect an MMC packet from the device in step S804.

After transmitting the image data, the digital camera 21 checks in step S711 whether a predetermined time has elapsed after shooting. In the first embodiment, "2. After Shooting (10 sec)" is selected in the transmission timing setup window of FIG. 5, so the digital camera 21 checks whether 10 sec has elapsed. If 10 sec has not elapsed, the digital camera 21 returns to step S705 to determine whether a device other than the digital camera 42 has issued a connection request. For example, when the digital camera 43 in FIG. 1 has also issued a connection request, the digital camera 21 can repeat the procedures in steps S706 to S710 to transmit captured image data to even the digital camera 43.

After returning to step S705, the digital S camera 21 may receive again a DN_Connect packet as a connection request from the digital camera 42. The WUSB host can check the CDID value field of the DN_Connect packet to identify a WUSB device which has issued a connection request. Thus, upon receiving a DN_Connect packet again from the digital camera 42, the digital camera 21 does not transmit a WCONNECTACK_IE packet representing connection permission in step S706. The digital camera 21 can control not to transmit the same image data to a WUSB device.

If the digital camera 42 has not received a WCONNECTACK_IE packet from the digital camera 21 in step S806, it returns to MMC packet detection in step S804. It can be avoided to establish the WUSB connection a plurality of number of times during one image data shooting & transmission sequence in the digital camera 21.

If the predetermined time has elapsed in step S711, the digital camera 21 stops the WUSB host function in step S712, and returns to step S702 to wait for the next shooting instruction.

Figure 8:
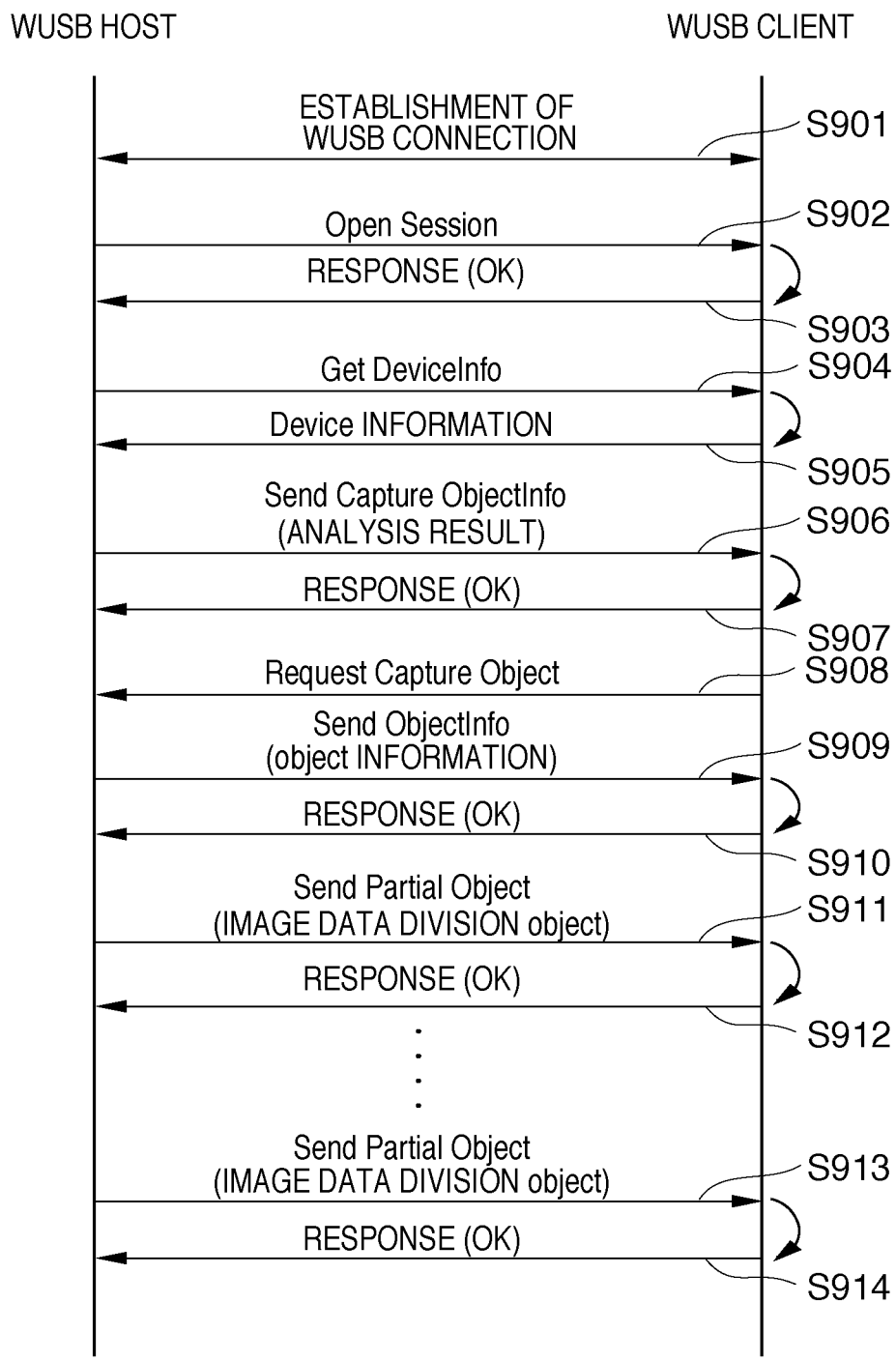
FIG. 8 is a chart showing the communication sequence of the digital camera in the first embodiment of the present invention.

FIG. 8 is a sequence chart showing a sequence until image data is transmitted after a WUSB host (the digital camera 21 in the first embodiment) and a WUSB device (the digital camera 42 in the first embodiment) establish a WUSB connection.

In step S901, the WUSB connection establishment procedure described in step S707 of FIG. 6 and step S807 of FIG. 7 is executed. The first embodiment assumes that the digital cameras 21 and 42 communication with each other using a class request defined by the USB STI class (Still Image Class). In step S902, the digital camera 21 serving as a WUSB host issues an OpenSession operation defined by the PTP (Picture Transfer Protocol) standard. Then, the digital camera 42 serving as a WUSB device sends back a response "OK" in step S903. In step S904, the digital camera 21 issues a PTP GetDeviceInfo operation. Then, the digital camera 42 sends back device information and a response in step S905.

In step S906, the digital camera 21 transmits image data information containing image data identifier information by a SendCaptureObjectInfo operation described by a PTP extended command. Then, the digital camera 42 sends back a response in step S907.

In step S908, the digital camera 42 transmits an image data transmission request by issuing a RequestCaptureObject event described by a PTP extended event. At this time, the digital camera 42 adds, to the image data transmission request packet, the identifier of image data, transmission of which is requested. Upon receiving the event, the digital camera 21 transmits attribute information on the captured image data as a PTP SendObjectInfo operation and Object information data in step S909. When image data can be received after confirming Object size information in the image data attribute information, the digital camera 42 sends back a response "OK" in step S910.

Upon receiving the response "OK", the digital camera 21 divides image data (into, e.g., 256-kbyte packets) and transmits them by a SendPartialObject operation described by a PTP extended command in step S911. Upon receiving the divided image data, the digital camera 42 sends back a response "OK" in step S912. The digital camera 21 repeats the SendPartialObject operation to transmit the image data.

As described above, according to the first embodiment, a device for transmitting captured image data automatically starts up as a WUSB host after shooting, and a device for receiving image data starts up as a WUSB device and waits for reception of image data. Even when image data is exchanged using a communication unit having the host and client modes, like the WUSB, the user need not assign the host and client modes to devices. Since captured image data is automatically transmitted after shooting, the user needs not cumbersomely designate image data to be transmitted. Since a device for transmitting image data operates as a WUSB host, it can be simultaneously connected to a plurality of devices. Once the device starts up as a WUSB host, it can transmit captured image data to a plurality of devices.

The roles of the host and device are set to activate the WUSB host function in a device which transmits image data, and the WUSB device function in a device which waits for reception of image data. This can reduce power consumption in both the host and device. More specifically, the digital camera 21 activates the WUSB host function only after capturing image data. Thus, the WUSB I/F (wireless communication unit) 23 in FIG. 2 need not always be activated, reducing power consumption. The digital camera 42 performs only the MMC packet detection operation while it does not receive any image data. The WUSB connection need not be kept established, reducing the CPU load and the RAM area where programs for the WUSB connection and image reception run. Power necessary for the wireless communication operation can be reduced by widening the MMC packet detection operation interval.

No specific WUSB host is kept connected, so image data from a plurality of digital cameras can be received.

It is controlled not to transmit image data other than one captured in step S710 of FIG. 6, preventing transmission of image data other than target one.

Second Embodiment

The second embodiment will explain a case where, among captured image data, image data for which it is recognized that the object person smiles, and image data for which it is recognized that two or more persons are photographed are automatically transmitted to another device.

The arrangement of a digital camera according to the second embodiment is the same as that of the digital camera according to the first embodiment. A difference from the first embodiment will be mainly described, and a description of the same part will not be repeated.

In the second embodiment, assume that the user selects "2. Select" in the transmission permission/inhibition condition setup window of FIG. 4. Further, assume that the user sets "○" in the item "2-a. Group Photos", "○" in the item "2-b. Smile", "×" in the item "2-c. Persons", and "×" in the item "2-d. Registered Persons". Also, assume that the user selects "2. After Shooting (10 sec)" in the transmission timing setup window of FIG. 5.

FIG. 9 shows a setup window for setting an image data reception timing in a digital camera 21 according to the second embodiment. The user can use the reception timing setup window to designate, for each state of the digital camera 21, whether to permit or inhibit reception of image data from another device. If the user sets "1. Playback Model" ON, a reception timing determination unit 331b determines that the time when the digital camera 21 is in the playback mode is the reception timing. If the user sets "2. Power Off" ON, the reception timing determination unit 331b determines that the time when a main switch & mode switch 33 of the digital camera is OFF is the reception timing. If the user sets "3. Shooting Mode" ON, the reception timing determination unit 331b determines that the time when the digital camera 21 is in the shooting mode is the reception timing.

When the user sets "3. Shooting Mode" ON, he can designate, for each detailed state, whether to permit or inhibit reception of image data from another device. If the user sets "3-a. During EVF" ON, the reception timing determination unit 331b determines that the time when an object to be captured is displayed live on a display 22 of the digital camera is the reception timing. If the user sets "3-b. During Shooting Preparation" ON, the reception timing determination unit 331b determines that the time when the user presses a switch SW1 (not shown) to start the AF operation and designate a shooting preparation is the reception timing. The switch SW1 is turned ON by pressing the release button halfway.

In the second embodiment, assume that the user sets the item "1. Playback Model" ON in the reception timing setup window. Also, assume that the user sets the item "2. Power Off" OFF. Further, assume that the user sets the item "3. Shooting Mode" ON, the item "3-a. During EVF" ON, and the item "3-b. During Shooting Preparation" OFF.

If the digital camera 21 can receive image data from another device at many timings, it rarely fails to receive image data captured by another device. However, if the WUSB device function and a program for receiving image data run parallel to the object image live display operation and shooting preparation operation, the RAM area necessary for the shooting preparation operation decreases, and the CPU load increases. This may delay the response of the digital camera 21 to the user or impair another performance. In addition, the shooting time lag until the shutter is released after the user designates shooting may be prolonged. When the WUSB device function is enabled, it consumes additional power, influencing the battery duration. For this reason, the second embodiment allows the user to set an image data reception timing for each camera state, as described above.

Figure 10:
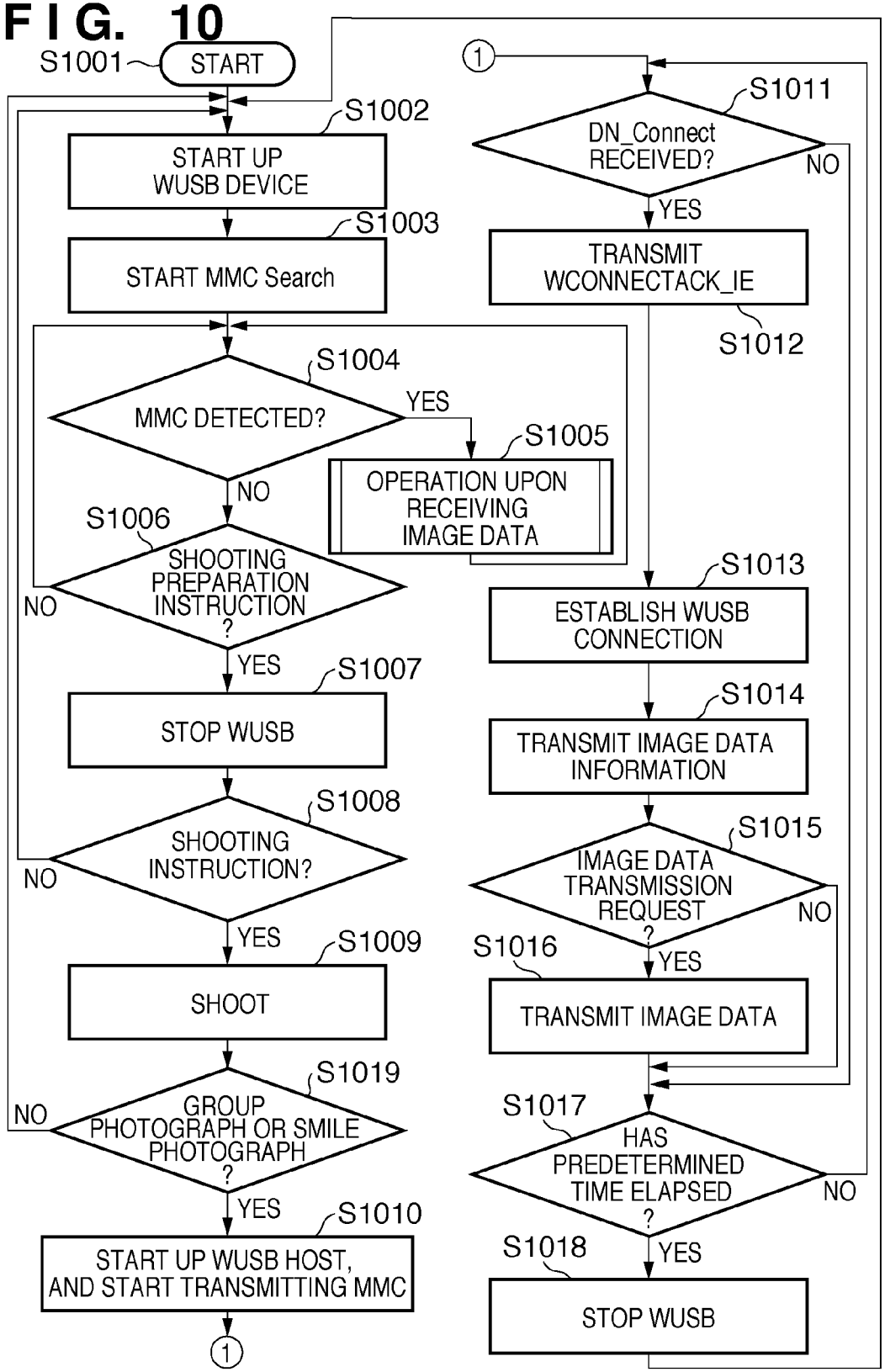
FIG. 10 is a flowchart for explaining the image data transmission sequence of a digital camera in the second embodiment of the present invention.
Figure 11:
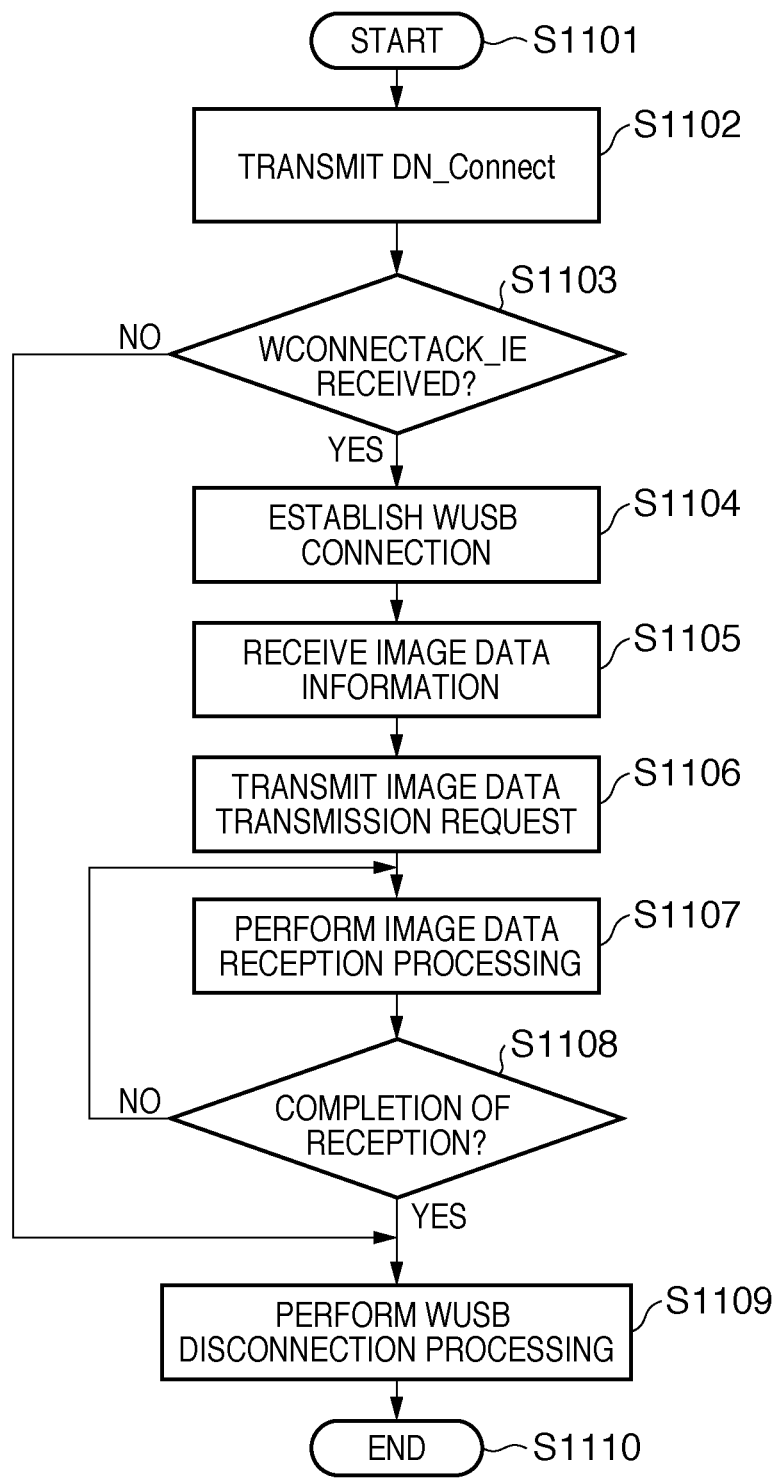
FIG. 11 is a flowchart for explaining the image data transmission sequence of the digital camera in the second embodiment of the present invention.

A sequence to transmit captured image data from the digital camera 21 to another device (e.g., a digital camera 42 in FIG. 1) in the second embodiment will be explained with reference to the flowcharts of FIGS. 10 and 11. FIGS. 10 and 11 are flowcharts showing an operation when the digital camera 21 is in the shooting mode. The operation of the digital camera 42 is the same as that described with reference to the flowchart shown in FIG. 7, and a description thereof will not be repeated. The digital camera 21 in the second embodiment operates to receive, in the shooting mode, image data captured by another device. The digital camera 21 also operates to determine whether to permit or inhibit transmission of image data captured by the digital camera 21, and if the transmission of image data is permitted, transmit the image data to another device. In the following description of the flowchart, a digital camera 43 in FIG. 1 operates, similar to the digital camera 21 in the second embodiment. A case where the digital camera 21 receives image data captured by the digital camera 43 will be exemplified. The operation of the digital camera 42 is the same as that described with reference to the flowchart shown in FIG. 7, and a case where the digital camera 21 transmits captured image data to the digital camera 42 will be exemplified.

In the second embodiment, the user sets the item "3. Shooting Mode" ON in the reception timing setup window of FIG. 9. Thus, the digital camera 21 starts up as a WUSB device in step S1002.

In step S1003, the digital camera 21 starts an MMC search operation, and searches for a WUSB host having undergone the Association process.

If the digital camera 21 detects in step S1004 the MMC packet of another digital camera (e.g., the digital camera 43 in FIG. 1) serving as a WUSB host having undergone the Association process, it advances to an operation in step S1005 upon receiving image data. A detailed operation sequence in step S1005 will be described later.

If the digital camera 21 does not detect any MMC packet in step S1004, it determines in step S1006 whether the user has designated a shooting preparation. In the second embodiment, the user sets the item "3-b. During Shooting Preparation" OFF in the reception timing setup window of FIG. 9. Thus, if the user has designated a shooting preparation, the digital camera 21 stops the WUSB device function in step S1007. If the user has not designated the shooting preparation, the digital camera 21 returns to step S1004.

In step S1008, the digital camera 21 determines whether the user has designated shooting.

If the user has not designated shooting within a predetermined time (e.g., about 10 sec) after designating a shooting preparation in step S1006, the digital camera 21 determines that the user has canceled shooting, and returns to step S1002 to start up as a WUSB device again.

If the user has designated shooting, the digital camera 21 performs a shooting operation in step $1009, obtaining image data. In the second embodiment, immediately after capturing an image, the digital camera 21 automatically transmits, to another device, image data for which it is recognized that the object person smiles, and image data for which it is recognized that two or more persons are photographed. For this purpose, in step S1019, an image analysis unit 331e analyzes the captured image data. If it is recognized that the object person in the analyzed image data smiles, and it is recognized that two or more persons are photographed, a transmission permission/inhibition determination unit 331d determines that the captured image data can be transmitted.

A transmission timing determination unit 331a determines, from the operation state of the digital camera 21 and the determination result of the transmission permission/inhibition determination unit 331d, that the current timing is an image data transmission timing. In step S1010, the digital camera 21 starts up as a WUSB host, and starts transmitting an MMC packet defined by the WUSB standard. If it is recognized for captured image data that the landscape is photographed or one person is photographed, the transmission timing determination unit 331a determines that the current timing is not an image data transmission timing. Thus, the digital camera 21 does not start up as a WUSB host, and returns to step S1002 to start up as a WUSB device again.

Upon receiving a DN_Connect packet from another digital camera (e.g., the digital camera 42 in FIG. 1) in step S1011, the digital camera 21 transmits a WCONNECTACK_IE packet representing connection permission in step S1012.

In step S1013, the digital camera 21 establishes a WUSB connection with the digital camera 42 to which the digital camera 21 has issued the connection permission. At this time, the digital camera 21 executes 4-way handshake processing complying with the WUSB standard, and negotiation processing using a GetDescriptor packet and SetConfiguration packet similar to those of the wired USB standard.

After establishing the WUSB connection, the digital camera 21 transmits, in step S1014, information of the image data captured in step S1009 to the digital camera 42. The information to be transmitted may also contain the image data identifier, information on the owner name of the digital camera 21, information on the shooting date and time, information on the data size of the image data, and information on the analysis result of the image analysis unit 331e.

In step S1015, the digital camera 21 checks whether it has received an image data transmission request from the digital camera 42. If the digital camera 21 has received an image data transmission request from the digital camera 42, it transmits, in step S1016, image data captured in step S1009 to the digital camera 42, and then advances to step S1017. If the digital camera 21 has not received an image data transmission request, it advances to step S1017 without performing the image data transmission processing.

If the identifier of image data not to be transmitted is designated upon receiving an image data transmission request in step S1015, the digital camera 21 controls not to execute transmission processing in step S1016.

In step S1017, the digital camera 21 checks whether a predetermined time has elapsed after shooting. In the second embodiment, "2. After Shooting (10 sec)" is selected in the transmission timing setup window of FIG. 5, so the digital camera 21 checks whether 10 sec has elapsed. If 10 sec has not elapsed, the digital camera 21 returns to step S1011 to determine whether a device other than the digital camera 42 has issued a connection request. If the predetermined time has elapsed, the digital camera 21 stops the WUSB host function in step S1018, and returns to step S1002 to start up as a WUSB device again.

The operation in step S1005 upon receiving image data will be explained with reference to the flowchart of FIG. 11.

Since the digital camera 21 has detected, in step S1004 of FIG. 10, the MMC packet of the digital camera 43 serving as a WUSB host having undergone the Association process, it transmits a DN_Connect packet as a WUSB connection request in step S1102.

If the digital camera 21 receives a WCONNECTACK_IE packet from a WUSB host in step S1103, it establishes a WUSB connection with the digital camera 43 by 4-way handshake processing or the like in step S1104.

If the digital camera 21 has not received a WCONNECTACK_IE packet in step S1103, it ends the operation upon receiving image data, and returns to the MMC packet detection operation in step S1004 of FIG. 10.

After establishing the WUSB connection, the digital camera 21 receives image data information from the digital camera 43 in step S1105. The digital camera 21 checks the received image data information, and if it determines that the received image data is desired one, transmits an image data transmission request in step S1106.

In step S1107, the digital camera 21 receives image data transmitted from the digital camera 43. In step S1108, the digital camera 21 checks whether the reception is complete. If the reception is not complete, the digital camera 21 continues the image data reception processing in step S1107. Upon completion of the reception, the digital camera 21 transmits a DN_Disconnect packet defined by the WUSB standard in step S1109, disconnecting the WUSB connection. As a result, the digital camera 21 ends the operation upon receiving image data, and returns to the MMC packet detection operation in step S1004 of FIG. 10.

As described above, according to the second embodiment, a device for transmitting captured image data automatically starts up as a WUSB host after shooting, and a device for receiving image data starts up as a WUSB device and waits for reception of image data. Even when image data is exchanged using a communication unit having the host and client modes, like the WUSB, the user need not assign the host and client modes to devices.

Since captured image data is automatically transmitted after shooting in accordance with the determination result of the transmission permission/inhibition determination unit 331d, the user needs not cumbersomely designate image data to be transmitted. In particular, only image data the object person may want, such as a smile photograph or group photograph, can be automatically transmitted to the device of the object person.

Since a device for transmitting image data operates as a WUSB host, it can be simultaneously connected to a plurality of devices. Once the device starts up as a WUSB host, it can transmit captured image data to a plurality of devices. Even when a plurality of persons are photographed, like a group photograph, captured image data can be transmitted to the devices of these persons.

Since the digital camera 21 activates the WUSB host function only after capturing image data, a WUSB I/F (wireless communication unit) 23 in FIG. 2 need not always be activated, reducing power consumption. The digital camera 42 performs only the MMC packet detection operation while it does not receive any image data. The WUSB connection need not be kept established, reducing the CPU load and the RAM area where programs for the WUSB connection and image reception run.

Power consumption can be reduced by widening the MMC packet detection operation interval.

No specific WUSB host is kept connected, so image data from a plurality of digital cameras can be received.

While the digital camera 21 neither prepares for shooting nor transmits captured image data, it can operate as a WUSB device to receive image data captured by another device. For example, when an owner 41 of the digital camera 43 shoots an image of an owner 44 of the digital camera 21, the digital camera 43 can automatically transmit the shot image data to the digital camera 21.

The second embodiment has been described on the premise that the user sets "2. After Shooting (10 sec)" in the transmission timing setup window of FIG. 5. However, when the user selects "3. During Playback" in this window, as described above, the transmission timing is not limited to the timing immediately after shooting. For example, when the transmission permission/inhibition determination unit 331d determines that the digital camera 21 can transmit image data displayed in the playback mode, the transmission timing determination unit 331a determines, as an image data transmission timing, the period during which the target image data is displayed. Even if the digital camera 42 cannot communicate with the digital camera 21 after the digital camera 21 performs a shooting operation, the digital camera 21 can transmit the captured image data to the digital camera 42 later. For example, even when the digital camera 42 does not reside in the WUSB communicable range or has not started up as a WUSB device, the digital camera 21 can transmit image data later. That is, the digital camera 21 can transmit image data to the digital camera 42 even a long time after shooting as long as the digital camera 42 is brought near the digital camera 21. More specifically, the digital camera 42 operates according to the flowchart of FIG. 7, and the digital camera 21 is set to the playback mode to display image data to be transmitted. Then, the digital camera 21 can transmit displayed image data.

The user can also use the reception timing setup window in FIG. 9 to set an image data reception timing. In this case, even when "1. Playback Model" is OFF, the user may want to receive image data captured by another camera while his digital camera is in the playback mode. The user can operate a wireless button 28 to forcibly start up the digital camera 21 in the second embodiment as a WUSB device while neither the WUSB host function nor WUSB device function is activated. The user need not set an image data reception timing again in the reception timing setup window of FIG. 9, and can easily receive image data captured by another camera.

Third Embodiment

The third embodiment will explain a case where captured image data is automatically transmitted to another device, and a shooting preparation operation is designated during transmission of the image data.

The arrangement of a digital camera according to the third embodiment is the same as that of the digital camera according to the first embodiment. A difference from the first embodiment will be mainly described, and a description of the same part will not be repeated.

In the third embodiment, assume that the user selects "1. All" in the transmission permission/inhibition condition setup window of FIG. 4. Further, assume that the user selects "2. After Shooting (10 sec)" in the transmission timing setup window of FIG. 5. Similar to the digital camera in the first embodiment, the digital camera in the third embodiment does not receive image data from another device in the shooting mode.

Figure 12A:
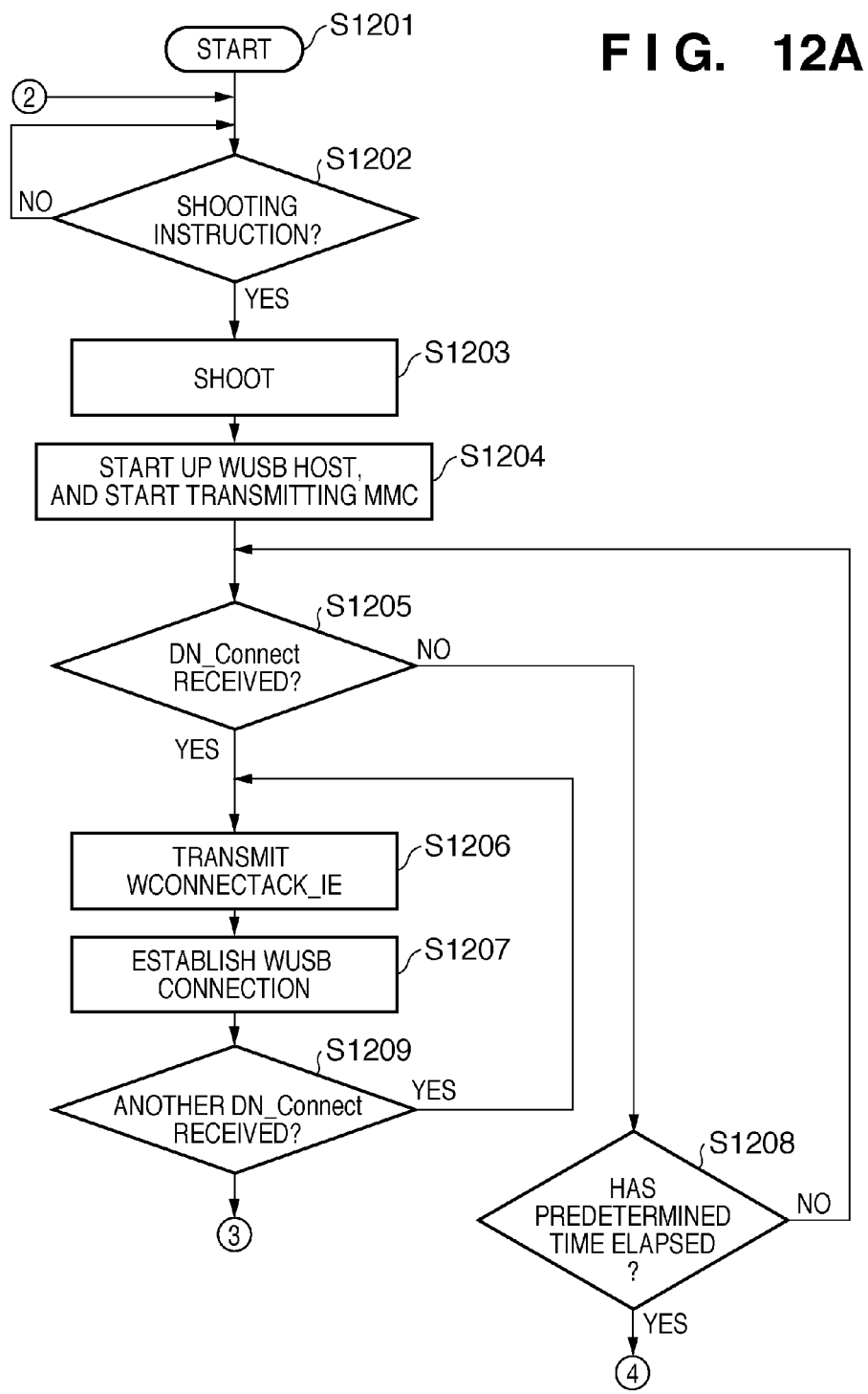
FIGS. 12A and 12B are flowcharts for explaining the image data transmission sequence of a digital camera in the third embodiment of the present invention.
Figure 12B:
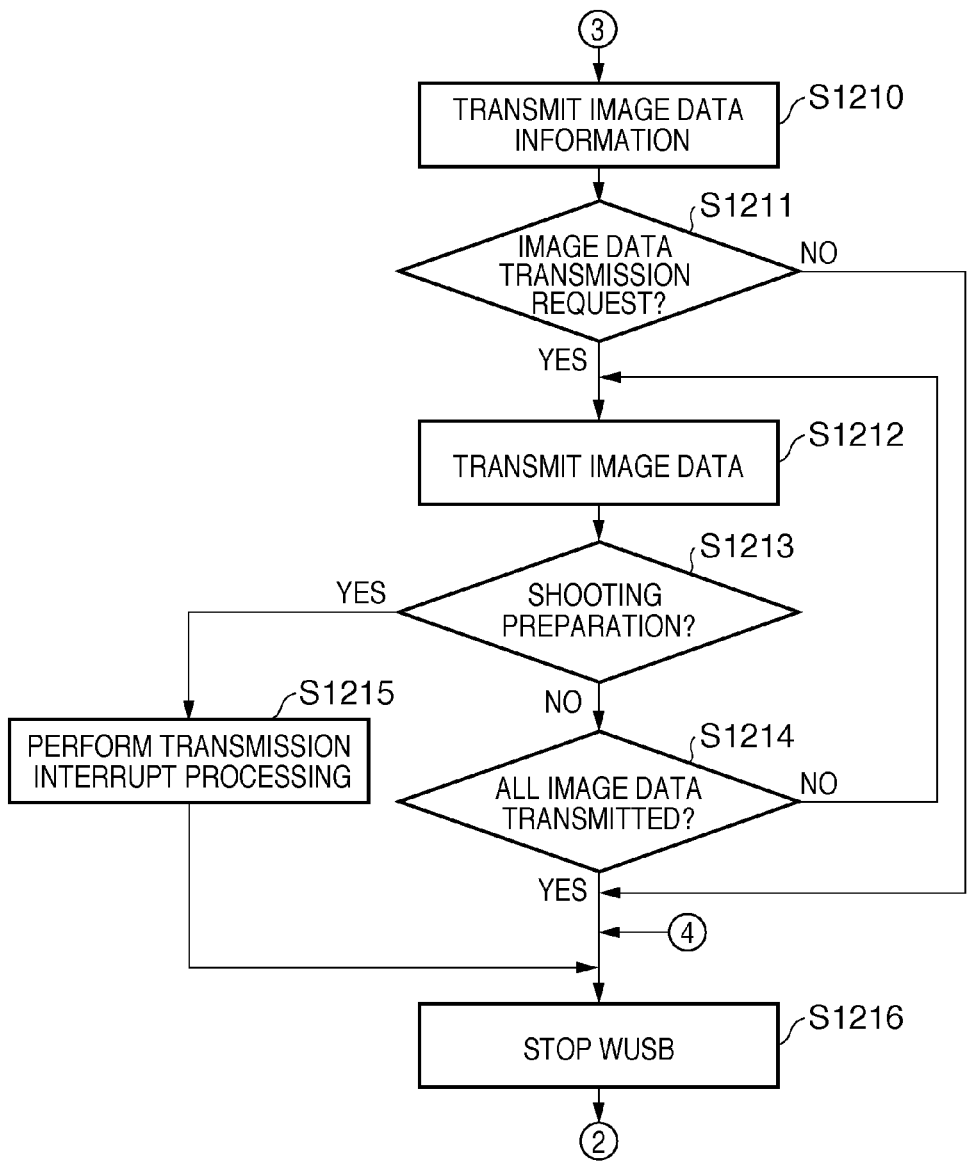

A sequence to transmit captured image data from a digital camera 21 to another device (e.g., a digital camera 42 in FIG. 1) in the third embodiment will be explained with reference to the flowcharts of FIGS. 12A and 12B. FIGS. 12A and 12B are flowcharts showing an operation when the digital camera 21 is in the shooting mode. The operation of the digital camera 42 is the same as the flowchart shown in FIG. 7, and a description thereof will not be repeated.

In step S1202, the digital camera 21 determines whether the user has designated shooting. If the user has designated shooting, the digital camera 21 performs a shooting operation in step S1203, obtaining image data.

In the third embodiment, immediately after capturing an image, the digital camera 21 automatically transmits the captured image data to another device. For this purpose, in step S1204, the digital camera 21 starts up as a WUSB host, and starts transmitting an MMC packet defined by the WUSB standard.

Upon receiving a DN_Connect packet from the digital camera 42 in step S1205, the digital camera 21 transmits a WCONNECTACK_IE packet representing connection permission in step S1206.

In step S1207, the digital camera 21 establishes a WUSB connection with the digital camera 42 to which the digital camera 21 has issued the connection permission. At this time, the digital camera 21 executes 4-way handshake processing complying with the WUSB standard, and negotiation processing using a GetDescriptor packet and SetConfiguration packet similar to those of the wired USB standard. The 4-way handshake processing includes authentication processing using a master key (CK) shared in advance in the Association process. Thus, no WUSB connection is established between devices which do not share the CC in the Association process.

After establishing the WUSB connection with the digital camera 42, the digital camera 21 checks in step S1209 whether it has received a DN_Connect packet from another WUSB device. Since the digital camera 21 operates as a WUSB host, it can simultaneously establish connections with a plurality of WUSB devices.

Upon receiving a DN_Connect packet from another WUSB device, the digital camera 21 transmits a WCON-NECTACK_IE packet representing connection permission in step S1206.

After establishing the WUSB connections with one or more WUSB devices which have issued connection requests, the digital camera 21 transmits, in step S1210, captured image data information to the WUSB-connected WUSB devices including the digital camera 42. The information to be transmitted may also contain the image data identifier, information on the owner name of the digital camera 21, information on the shooting date and time, information on the data size of the image data, and information on the analysis result of an image analysis unit 331e.

If a shooting preparation operation is designated during transmission of image data, the digital camera 21 in the third embodiment interrupts the transmission of image data, and gives priority to the shooting preparation operation. When the digital camera 21 executes a continuous shooting operation, it transmits not one captured image data every time the image data is captured, but a plurality of captured image data upon completion of the continuous shooting operation.

The digital camera 21 holds, in a RAM 322, a table representing an image data transmission state as shown in FIG. 13. In FIG. 13, a field 1301 represents the file name of image data, and a field 1302 represents the determination result of a transmission permission/inhibition determination unit 331d. The digital camera 21 in the third embodiment is set to transmit all captured image data, so "○" is recorded in the field 1302. A field 1303 represents the transmission state of each image data. "Transmitted successfully" means that image data was transmitted. "Interrupted" means that transmission of image data was interrupted. "Untransmitted" means that no image data transmission operation has been executed yet.

In step S1210, the digital camera 21 transmits image data information for which "untransmitted" and "interrupted" are recorded in the transmission state table of FIG. 13.

In step S1211, the digital camera 21 checks whether it has received image data transmission requests from the WUSB devices including the digital camera 42. As shown in step S908 of FIG. 8, the image data transmission request is issued by issuing a RequestCaptureObject event described by a PTP extended event. For example, when issuing three image data transmission requests, the digital camera 42 issues three RequestCaptureObject events by adding, to the respective events, the identifiers of image data, transmission of which is requested.

Upon receiving an image data transmission request from the digital camera 42, the digital camera 21 divides image data captured in step S1203 into a proper data size, and sequentially transmits the divided image data to the WUSB devices including the digital camera 42 in step S1212.

If the digital camera 21 has not received an image data transmission request from any WUSB device, it advances to step S1216 without performing image data transmission processing.

If a shooting preparation operation is designated during transmission of image data, the digital camera 21 in the third embodiment interrupts the transmission of image data. For this purpose, the digital camera 21 checks in step S1213 whether it has received a shooting preparation instruction.

If the digital camera 21 has received a shooting preparation instruction, it interrupts the transmission of image data in step S1215. At this time, for image data, transmission of which has not been completed, "interrupted" is recorded in the transmission state field 1303 corresponding to the image data in the transmission state table of FIG. 13.

If the digital camera 21 has not received a shooting preparation instruction, it determines in step S1214 whether it has transmitted all image data, transfer of which has been requested in step S1211.

If the digital camera 21 has transmitted all image data, it advances to step S1216. If the digital camera 21 has not transmitted all image data, it shifts to step S1212 to continue transmission of untransmitted image data and transmission of image data to another WUSB device. During the image data transmission operation, a display 22 of the digital camera 21 keeps displaying captured image data, and an LED 30 flickers to notify the user that the image data is being transmitted. As for image data, transmission of which is complete, "Transmitted successfully" is recorded in the transmission state field 1303 corresponding to the image data in the transmission state table of FIG. 13.

Upon completion of transmitting all image data, the digital camera 21 stops the WUSB host function in step S1216, and returns to step S1202 to wait for the next shooting instruction.

If the digital camera 21 has not received DN_Connect packets from the WUSB devices including the digital camera 42 in step S1205, it checks in step S1208 whether a predetermined time has elapsed after shooting. In the third embodiment, "2. After Shooting (10 sec)" is selected in the transmission timing setup window of FIG. 5, so the digital camera 21 checks whether 10 sec has elapsed. If 10 sec has not elapsed, the digital camera 21 returns to step S1205 to determine whether it has received a DN_Connect packet as a connection request.

If the predetermined time has elapsed in step S1208, the digital camera 21 stops the WUSB host function in step S1216, and returns to step S1202 to wait for the next shooting instruction.

As described above, when transmitting image data, the digital camera 21 according to the third embodiment divides and transfers the image data. The digital camera 21 checks whether it has received a shooting preparation instruction during transfer. If the digital camera 21 has received a shooting preparation instruction, it interrupts the transmission of image data, and gives priority to the shooting preparation operation. Even during transmission of image data, the digital camera 21 can capture a new image without waiting for the completion of the transmission. The image data, transmission of which is interrupted, can be transmitted at a timing to transmit newly captured image data.

Even if the digital camera 21 receives a request in step S1211 to transmit image data for which "×" is recorded in the transmission permission/inhibition field 1302 of the transmission state table of FIG. 13, it controls not to transmit the image data in step S1212. This can prevent transmitting image data except for target image data.

Other Embodiments

The object of the embodiments is also achieved by the following method. More specifically, a storage medium (or recording medium) which stores the program codes of software for implementing the functions of the above-described embodiments is supplied to a system or apparatus. The computer (or the CPU or MPU) of the system or apparatus reads out and executes the program codes stored in the storage medium. In this case, the program codes read out from the storage medium implement the functions of the above-described embodiments, and the storage medium which stores the program codes constitutes the present invention. The functions of the above-described embodiments are implemented when the computer executes the readout program codes. Also, the present invention includes a case where an OS (Operating System) or the like running on the computer performs part or all of actual processing on the basis of the instructions of the program codes and thereby implements the functions of the above-described embodiments.

Further, the present invention includes the following case. More specifically, the program codes read out from the storage medium are written in the memory of a function expansion card inserted into the computer or the memory of a function expansion unit connected to the computer. Then, the CPU of the function expansion card or function expansion unit performs part or all of actual processing on the basis of the instructions of the program codes, thereby implementing the functions of the above-described embodiments.

When the present invention is applied to the storage medium, the storage medium stores program codes corresponding to the above-described sequences.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-322543, filed Dec. 13, 2007, which is hereby incorporated by reference herein in its entirety.

What is claimed is:

1. An image capturing apparatus having a plurality of communication modes comprising:
   an image capturing unit adapted to capture an object image and obtain image data; and
   a control unit adapted to control said image capturing apparatus,
   wherein the plurality of communication modes include a host mode in which said image capturing apparatus is capable of communicating with a plurality of external devices and a client mode in which said image capturing apparatus is capable of communicating with one of the plurality of external devices and is incapable of simultaneously communicating with the plurality of external devices, and
   wherein said control unit is able to automatically switch said image capturing apparatus to the host mode, establishes communication with the plurality of external devices, which are in the client mode, in accordance with connection requests from the external devices which are in the client mode, and transmits image data to the external devices to which the communication is established in accordance with requests from the external devices to which the communication is established after an image capturing instruction is applied to said image capturing unit.

2. The apparatus according to claim 1, further comprising a transmission unit adapted to transmit a first signal, which indicates that said image capturing apparatus is switched to the host mode, after said image capturing apparatus is switched to the host mode.

3. The apparatus according to claim 1, further comprising a reception device adapted to receive a second signal, which indicates that the external device is switched to the host mode, from the external device, wherein said control unit automatically switches said image capturing apparatus to the client mode in a case that said image capturing apparatus is not in the host mode and said reception device receives the second signal.

4. The apparatus according to claim 1, wherein said control unit automatically switches said image capturing apparatus to the host mode in a case that the image capturing instruction is applied to said image capturing unit and said image capturing apparatus is able to transmit the image data obtained by said image capturing unit.

5. The apparatus according to claim 1, further comprising a detection unit adapted to detect a person from the image data obtained by said image capturing unit, wherein said control unit automatically switches said image capturing apparatus to the host mode when said detection unit detects a person.

6. The apparatus according to claim 1, further comprising a detection unit adapted to detect a person from the image data obtained by said image capturing unit, wherein said control unit automatically switches said image capturing apparatus to the host mode when said detection unit detects a plurality of persons.

7. The apparatus according to claim 1, further comprising a detection unit adapted to detect a person from the image data obtained by said image capturing unit, wherein said control unit automatically switches said image capturing apparatus to the host mode when said detection unit detects a person and the person is recognized to smile.

8. The apparatus according to claim 1, wherein the transmission of the image data is terminated when the image capturing instruction is received during the transmission operation of the image data.

9. The apparatus according to claim 8, the transmission of the image data which is terminated is restarted by requests from the external devices after the image capturing is completed.

10. The apparatus according to claim 1, wherein said image capturing unit has a continuous shooting mode in which images are continuously captured, and wherein in a case that said image capturing unit captures images by the continuous shooting mode, after a plurality of images captured by the continuous shooting mode are generated, said image capturing apparatus transmits the plurality of images to the external devices in accordance with requests from the external devices.

11. A method of controlling an image capturing apparatus having a plurality of communication modes, comprising:
   capturing an object image and obtaining image data; and
   controlling said image capturing apparatus by a control unit,
   wherein the plurality of communication modes include a host mode in which said image capturing apparatus is capable of communicating with a plurality of external devices and a client mode in which said image capturing apparatus is capable of communicating with one of the plurality of external devices and is incapable of simultaneously communicating with the plurality of external devices, and wherein, in said controlling step, said control unit automatically switches said image capturing apparatus to the host mode, outputs information indicating that said image capturing apparatus is in the host mode, establishes communication with the plurality of external devices, which are in the client mode, in accordance with connection requests from the external devices which are in the client mode, and transmits image data to the external devices to which the communication is established in accordance with requests from the external devices to which the communication is established after an image capturing instruction is applied to said image capturing unit.

12. A computer-readable storage medium storing computer-executable instructions, the computer-executable instructions causing a computer to execute the method according to claim 11.

* * * * *